(12) United States Patent
Agarwal

(10) Patent No.: US 11,237,912 B1
(45) Date of Patent: *Feb. 1, 2022

(54) STORAGE SNAPSHOT MANAGEMENT

(71) Applicant: Amazon Technologies, Inc., Seattle, WA (US)

(72) Inventor: Puneet Agarwal, Jersey City, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

This patent is subject to a terminal disclaimer.

(21) Appl. No.: 16/408,341

(22) Filed: May 9, 2019

Related U.S. Application Data

(63) Continuation of application No. 15/277,690, filed on Sep. 27, 2016, now Pat. No. 10,324,803.

(51) Int. Cl.
*G06F 7/00* (2006.01)
*G06F 11/14* (2006.01)
*G06F 16/11* (2019.01)

(52) U.S. Cl.
CPC ...... *G06F 11/1448* (2013.01); *G06F 11/1461* (2013.01); *G06F 16/113* (2019.01); *G06F 2201/84* (2013.01)

(58) Field of Classification Search
CPC .............. G06F 16/113; G06F 11/1448; G06F 11/1461; G06F 2201/84
See application file for complete search history.

(56) References Cited

U.S. PATENT DOCUMENTS

| | | | |
|---|---|---|---|
| 7,389,313 B1* | 6/2008 | Hsieh | G06F 11/2071 |
| 2015/0212893 A1* | 7/2015 | Pawar | G06F 11/1448 |
| | | | 707/649 |
| 2015/0212897 A1* | 7/2015 | Kottomtharayil | G06F 11/1464 |
| | | | 714/20 |
| 2015/0227435 A1* | 8/2015 | Ashutosh | G06F 11/1451 |
| | | | 711/162 |
| 2016/0188415 A1* | 6/2016 | Karinta | G06F 11/1471 |
| | | | 707/654 |
| 2017/0139782 A1* | 5/2017 | Chen | G06F 16/27 |

* cited by examiner

*Primary Examiner* — Mohammed R Uddin
(74) *Attorney, Agent, or Firm* — Thomas Horstemeyer, LLP

(57) ABSTRACT

A technology is described for managing storage snapshots of storage volumes. In one example of the technology, a request may be received to create a storage snapshot of a storage volume associated with a tag. The tag may be assigned to a computing instance hosted in a service provider environment, and the storage volume may be assigned for use by the computing instance. In response to the request to create the storage snapshot, the storage volume associated with the tag may be identified, and the storage snapshot of the storage volume associated with the tag may be created.

20 Claims, 11 Drawing Sheets

STORAGE SNAPSHOT MANAGEMENT

PRIORITY DATA

This application is a continuation of U.S. patent application Ser. No. 15/277,690, filed Sep. 27, 2016, which is incorporated herein by reference.

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given hardware computing resource which has been virtualized.

Computing instances may be assigned block level storage volumes that may be utilized by the computing instances in performing various operations. Data on the storage volumes may be backed up by creating point-in-time storage snapshots. The storage snapshots may be incremental backups of block level storage, such that blocks that have changed since a last snapshot was created may be saved, thereby minimizing an amount of time needed to create a storage snapshot. When deleting a storage snapshot, only the data unique to that storage snapshot may be removed. In the event that data contained on a storage volume may need to be restored, active storage snapshots associated with the storage volume may contain information needed to restore the data to a new storage volume.

DETAILED DESCRIPTION

Figure 1A:
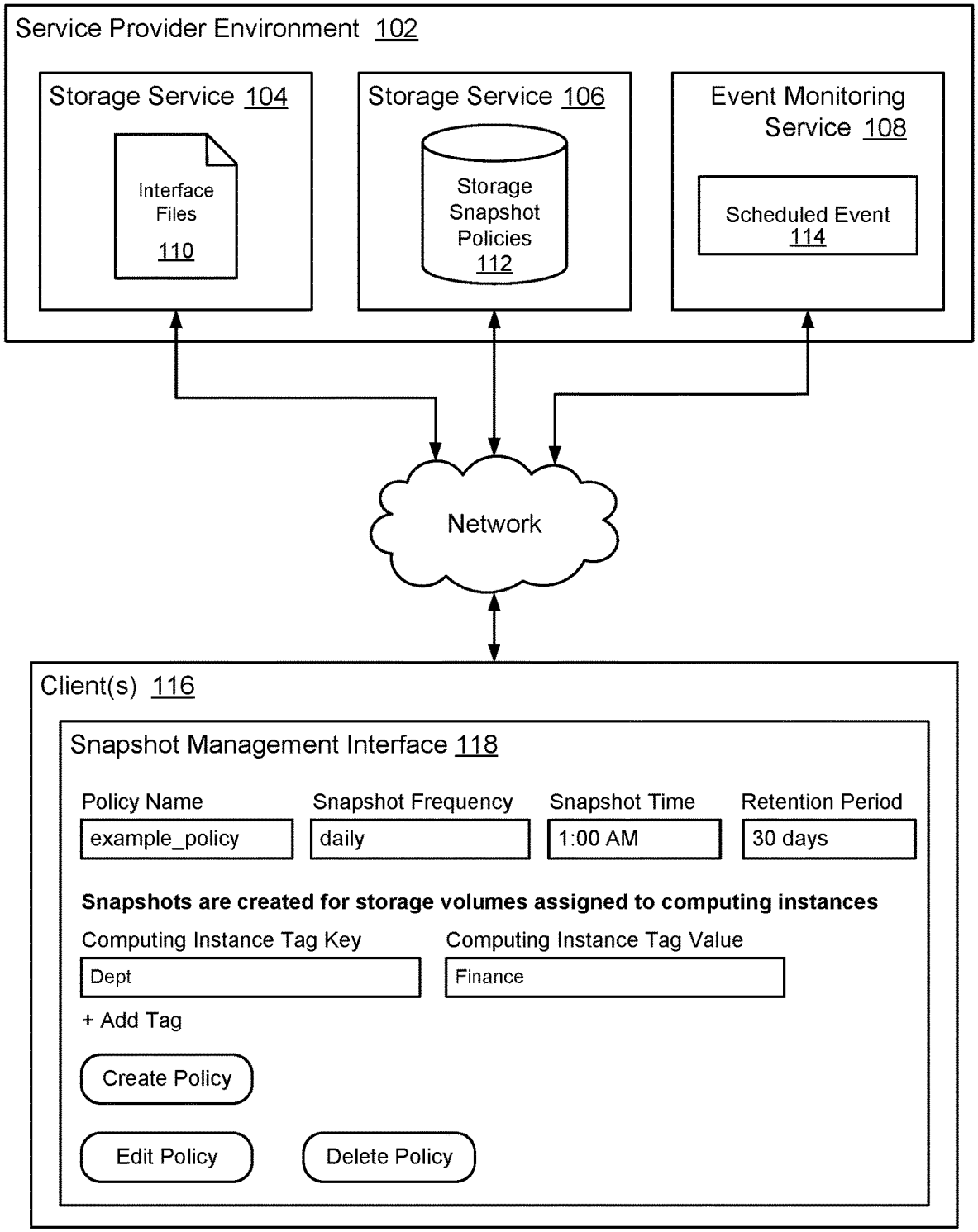
FIGS. 1a-e are block diagrams illustrating example components and relationships for a system for managing a storage snapshot policy used to schedule and maintain storage snapshots of storage volumes assigned to computing instances in a service provider environment.

A technology is described for managing storage snapshots of storage volumes assigned to or linked with computing instances hosted in a service provider environment using managed service components. The managed service components may be used to create a "serverless" architecture, which may be an abstraction that allows a service provider and customers to create and operate systems without regard to any specific server used to execute the functionality of the system. For example, a service provider environment may include managed service components used in a system. The managed service components may include, but are not limited to: compute services, data store services, network services, monitoring services, and the like. A compute service function that executes on a managed compute service function platform provided by a service provider may be developed to perform different functions of a system. The compute service function may be submitted for execution without having to specify any particular server used to host the compute service function.

In one example configuration, managed service components may be configured to provide a customer with a snapshot management interface that allows the customer to create a storage snapshot policy used to schedule and manage storage snapshots associated with storage volumes (e.g., virtualized block storage) assigned to the customer's computing instances. The managed service components may be configured to create and maintain storage snapshots according to the storage snapshot policy. For example, a monitoring service may be configured to activate a compute service function in response to a scheduled event. The compute service function may be configured to identify storage volumes (e.g., virtualized storage volumes located in a storage service in a service provider environment) assigned to computing instances using tags assigned to the computing instances (and thus imputed to the storage volumes), which may be specified in the storage snapshot policy, and to create storage snapshots of the storage volumes. The storage snapshots may be retained for a period of time specified by the storage snapshot policy and may be automatically deleted thereafter.

FIGS. 1a-e are block diagrams illustrating a high level example of a system configured to provide a customer with a snapshot management interface 118 used to create and manage storage snapshot policies 112 that are used to schedule and maintain storage snapshots of storage volumes assigned to computing instances in a service provider environment 102. The storage snapshot policies 112 may include information used to schedule and maintain storage snapshots of storage volumes assigned to computing instances hosted within a service provider environment 102. A storage snapshot may be an incremental backup of block level storage. For example, a storage snapshot may be a representation of a data set at a moment in time. Multiple storage snapshots of a particular storage volume may be taken at various moments in time, and later storage snapshots may depend on earlier storage snapshots. For example, an initial storage snapshot of a storage volume may involve making a full copy of the storage volume, whereas a later storage snapshot of the storage volume may involve copying data that has changed since creating an earlier storage snapshot. Alternatively, full copies may be stored for each snapshot.

Figure 3:
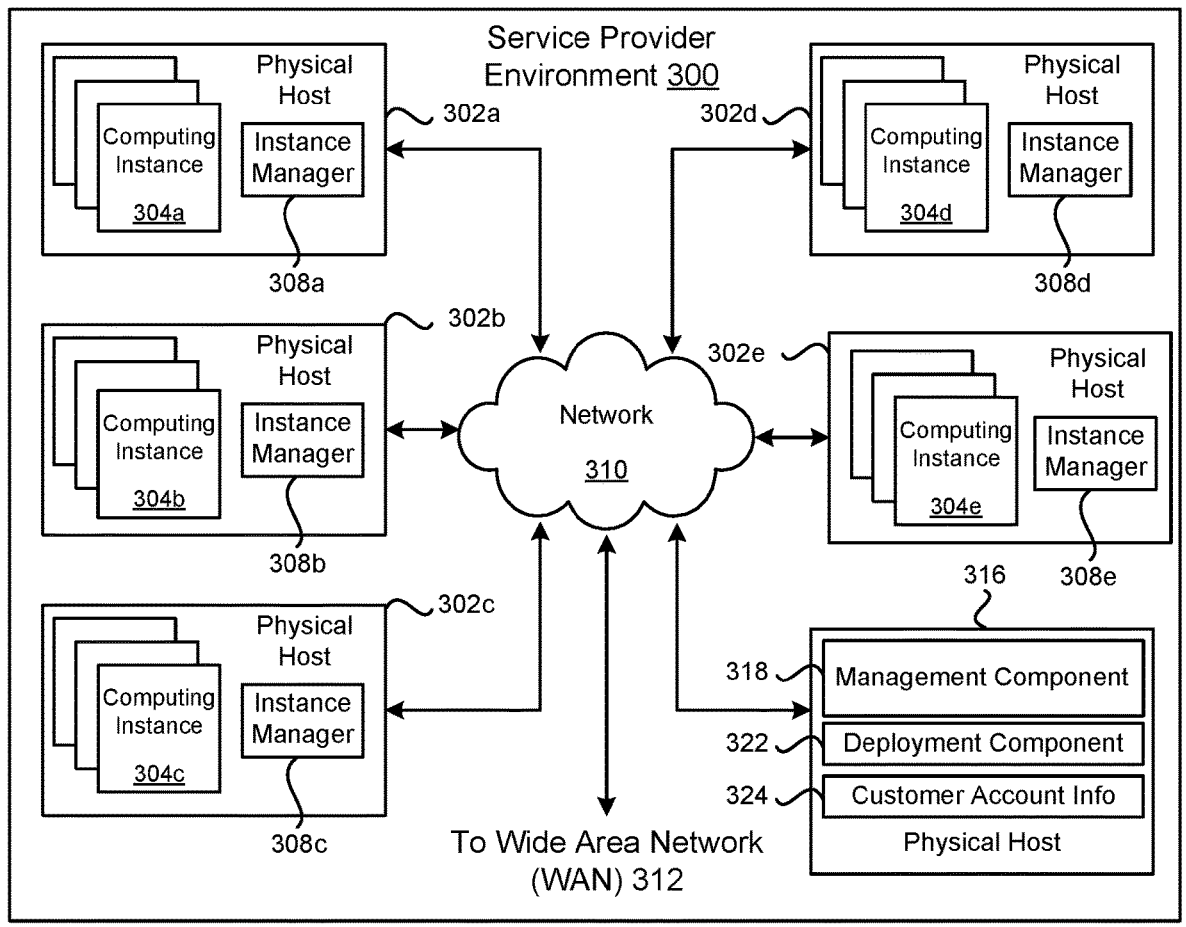
FIG. 3 is a block diagram that illustrates an example service provider environment that includes computing instances.

The service provider environment 102 may include a number of servers configured to host computing instances as described in relation to FIG. 3. Information included in a storage snapshot policy 112 may include, for example, information that specifies computing instances for which the storage snapshot policy 112 applies and may include a snapshot scheduled frequency and scheduled time for creating storage snapshots for storage volumes assigned to the computing instances, as well as a retention period for maintaining storage snapshots created from the storage volumes assigned to the computing instances.

The system may include one or more clients 116 that are in network communication with managed service components included in the service provider environment 102 that collectively enable customers to manage storage snapshots of storage volumes assigned to computing instances hosted in the service provider environment 102. As illustrated, the service provider environment 102 may include a storage service 104 used to store interface files 110 that are executable by a browser application on a client 116.

In one example, the storage service 104 may provide object-based storage and the interface files 110 may be stored in a storage container (e.g., a "bucket") referenced by a URL (Uniform Resource Locator). A client 116 may retrieve the interface files 110 from the storage service 104 using the URL. As an example, a client 116 may be configured to use the URL to retrieve the interface files 110 from the storage service 104. Illustratively, the interface files 110 may include, but are not limited to: HTML (Hypertext Markup Language) files, CSS (Cascading Style Sheets) files, XML (Extensible Markup Language) files, JAVASCRIPT files, and the like. In accessing the interface files 110, a username/password, federated identity or another authentication method may be used to authenticate a customer associated with a client 116.

The interface files 110 retrieved from the storage service 104 may be executed using a browser application configured to display the snapshot management interface 118 within a browser window, allowing a customer to interact with the snapshot management interface 118 and create, edit, and delete storage snapshot policies 112. Using the snapshot management interface 118, a customer may create a storage snapshot policy 112 by providing information used to identify computing instances associated with the storage snapshot policy 112, information used to schedule the creation of storage snapshots of storage volumes assigned to the computing instances, and information used to manage the retention of the storage snapshots. As an example, the snapshot management interface 118 may allow a customer to: specify a policy name for a storage snapshot policy 112; specify tags for computing instances, thereby associating the storage snapshot policy 112 with storage volumes assigned to the computing instances; specify a frequency (e.g., hourly, daily, weekly, monthly, etc.) for how often a storage snapshot is created; specify a time (e.g., time of day) or condition (e.g., storage volume I/O load) to create the storage snapshot; and specify a retention period (e.g., N number of days) for maintaining the storage snapshot, after which the storage snapshot may be automatically deleted. Namely, the storage snapshot may be deleted without first obtaining confirmation from a customer.

Figure 1B:
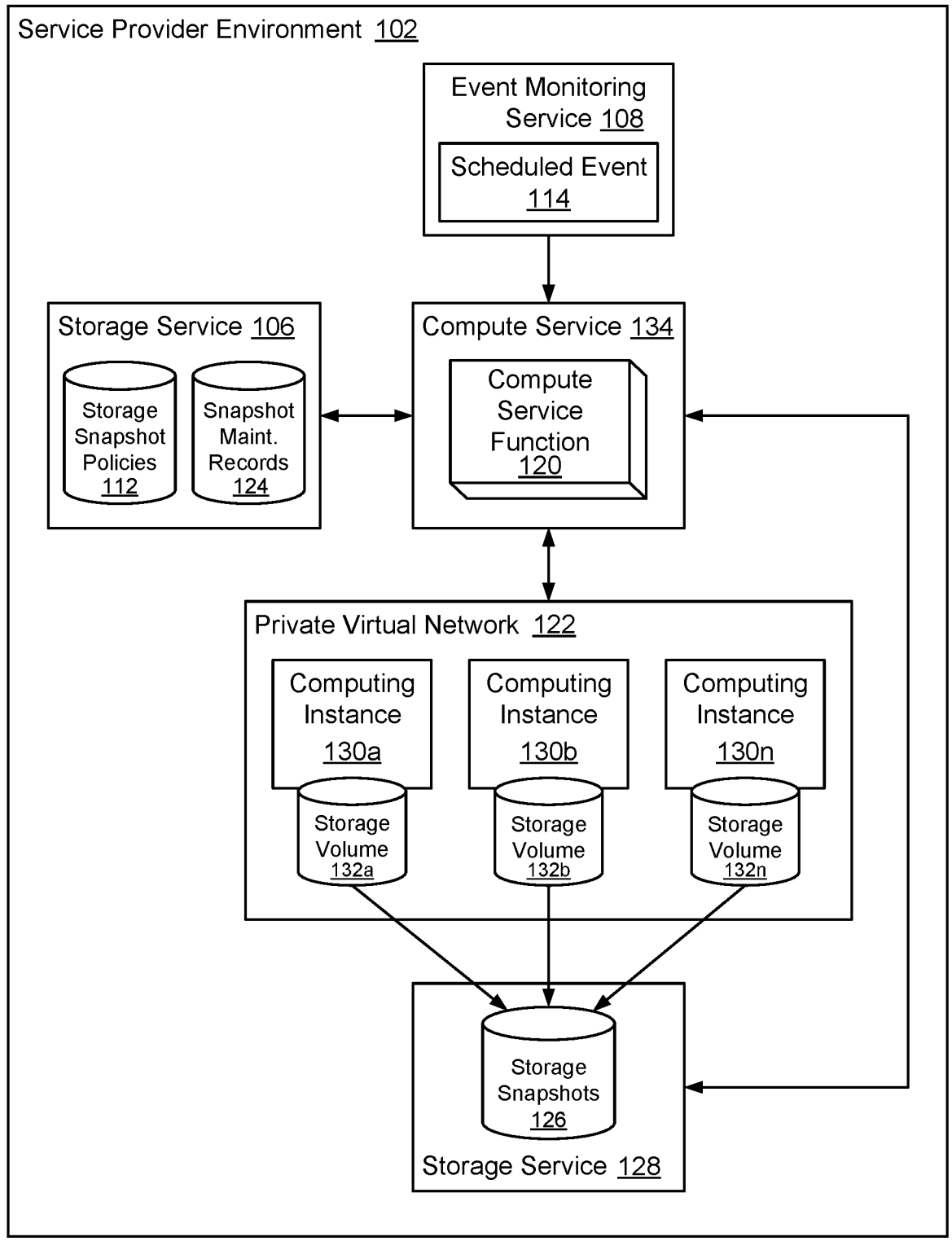

Storage snapshot policies 112 created by a customer using the snapshot management interface 118 may be stored to a storage service 106, where the snapshot policies 112 may be accessible to managed service components (as shown in FIG. 1b) configured to create and maintain storage snapshots according to the storage snapshot policies 112. For example, the snapshot management interface 118 may be configured to connect to the storage service 106 using a customer's identity information (e.g., username/password or federated identity) for a storage snapshot policy 112 entered via the snapshot management interface 118 may be sent to the storage service 106 in response to a customer command to create the storage snapshot policy 112.

As part of creating a storage snapshot policy 112, a scheduled event 114 (and/or a defined event) may be created according to the storage snapshot policy 112 and the scheduled event 114 may be registered with an event monitoring service 108. The event monitoring service 108 may detect the scheduled event 114 (e.g., a specified day and time) and launch a compute service function that creates storage snapshots of storage volumes assigned to computing instances as described below in association with FIG. 1b.

In one example, the snapshot management interface 118 may be configured to create a scheduled event 114 according to a snapshot frequency, time, and/or condition specified in a storage snapshot policy 112, and then connect to the event monitoring service 108 using a customer's identity information and request that the scheduled event 114 be registered with the event monitoring service 108. For example, a scheduled event 114 may specify a frequency and time for launching a compute service function along with an identifier used to identify the storage snapshot policy 112 associated with the scheduled event 114. The event monitoring service 108 may provide an identifier for a storage snapshot policy 112 to the compute service function, enabling the compute service function to retrieve storage snapshot policy information (e.g., computing instance tags) from the storage service 106, which may be used by the compute service function in creating storage snapshots.

In another example, a customer may install a tool kit that places the interface files 110 in the customer's storage container managed by the storage service 104, creates a storage snapshot policy 112 on the storage service 106, and creates a scheduled event 114 on the event monitoring service 108. The storage snapshot policy 112 and the scheduled event 114 may be updated by the customer via the snapshot management interface 118.

A customer may manage existing storage snapshot policies 112 using the snapshot management interface 118. For example, the snapshot management interface 118 may be used to retrieve a storage snapshot policy 112 from the storage service 106 and a customer may edit the storage snapshot policy 112 using the snapshot management interface 118. Also, a customer may delete a storage snapshot policy 112 using the snapshot management interface 118. As will be appreciated, the snapshot maintenance interface 118 illustrated in FIG. 1a is merely representative of a snapshot maintenance interface and is not limiting.

FIG. 1b illustrates service management components included in the service provider environment 102 configured to invoke storage snapshot policies 112 used in creating and managing storage snapshots 126. The service management components may include: the storage service 106 that maintains the snapshot policies 112, as well as snapshot maintenance records 124 for storage snapshots 126 created using the storage snapshot policies 112; the event monitoring service 108 which may be configured to detect a scheduled event 114 registered with the event monitoring service 108 and launch an compute service function 120 in response to detecting the scheduled event 114; and a compute service 134 for hosting a compute service function 120 that, when executed, creates and manages storage snapshots 126 of storage volumes 132a-c assigned to computing instances 130a-n. In one example, the computing instances 130a-n may be included in a customer's private virtual network 122 (e.g., a private "cloud"). In another example, the computing instances 130a-n may be included in a non-private network managed by a service provider. And in another example, the computing instances 130a-n may be hosted on a customer's servers. For example, the customer's servers may be located in a customer data center which may be connected to a service provider environment 102 using a dedicated network connection.

As described above, a scheduled event 114 or defined event may be associated with a particular storage snapshot policy 112 and may specify a schedule (e.g., daily at 1:00 AM) and/or condition (e.g., disk I/O less than 10%) for creating storage snapshots 126 in accordance with a storage snapshot policy 112. A scheduled event 114 may be registered with the monitoring service 108, and in detecting the scheduled event 114, the monitoring service 108 may request that a compute service function 120 be launched. For example, after detecting a scheduled event 114, the event monitoring service 108 may send a request to the compute service 134 to launch a compute service function 120.

In one example, the scheduled event 114 may cause the monitoring service 108 to periodically activate (e.g., wake up) and reference a storage snapshot policy 112 in order to determine whether a storage snapshot is to be created at that time. In the case that the storage snapshot policy 112 indicates that a storage snapshot may be created at that time, the monitoring service 108 may activate the compute service function 120. As a specific example, a scheduled event 114 may wake up the event monitoring service 108 every few minutes (e.g., 5, 10, 30, 120 minutes), whereupon the event monitoring service may retrieve a storage snapshot policy 112 associated with the scheduled event from the storage service 106.

The compute service 134 may host the compute service function 120 using virtualized compute resources as described in association with FIG. 3. A compute service function 120 may include a segment of program code that may be like a function, and the program code may receive parameters, perform processing, and provide return values. In one aspect, the compute service function 120 may execute on a managed compute service function platform for back-end web services that runs a defined compute service function 120 on a computing instance hosted in a service provider environment. That is, a compute service function 120 may execute in a compute service 134 that runs code in response to requests to execute the compute service function 120, and automatically manages the compute resources used by the compute service function 120. Once a compute service function 120 has been executed and results have been returned, the compute service function 120 and results may be removed from the memory of a computing instance or software container used to execute the compute service function 120. A compute service function 120 provides for building smaller, on-demand applications that may be responsive to events and new information, and may comprise one or more components included in a "serverless" architecture.

In one example, a request to the compute service 134 to launch an compute service function 120 may include identifying information for the storage snapshot policy 112 which may be provided to the compute service function 120 so that the storage snapshot policy 112 associated with the scheduled event 114 may be retrieved. For example, a compute service function 120 may receive an identifier for a storage snapshot policy 112 as a parameter when the compute service function 120 is launched.

In one example, the compute service function 120 may be configured to initiate storage snapshots 126 of one or more storage volumes 132a-n assigned to computing instances 130a-n. The computing instances 130a-n may be included in a private virtual network 122. As part of creating a storage snapshot 126, the compute service function 120 may be configured to retrieve a storage snapshot policy 112 from the storage service 106 using an identifier provided by the event monitoring service 108.

A storage snapshot policy 112 may be linked to one or more computing instances 130a-n via tags assigned to the computing instances 130a-n which may be specified in the storage snapshot policy 112 as described earlier. As will be appreciated, other types of identifiers for computing instances 130a-n may be used to link a storage snapshot policy 112 to one or more computing instances 132a-n. For example, a resource identifier or another type of identifier for a computing instance 132a-n may be linked to a storage snapshot policy 112.

Figure 2:
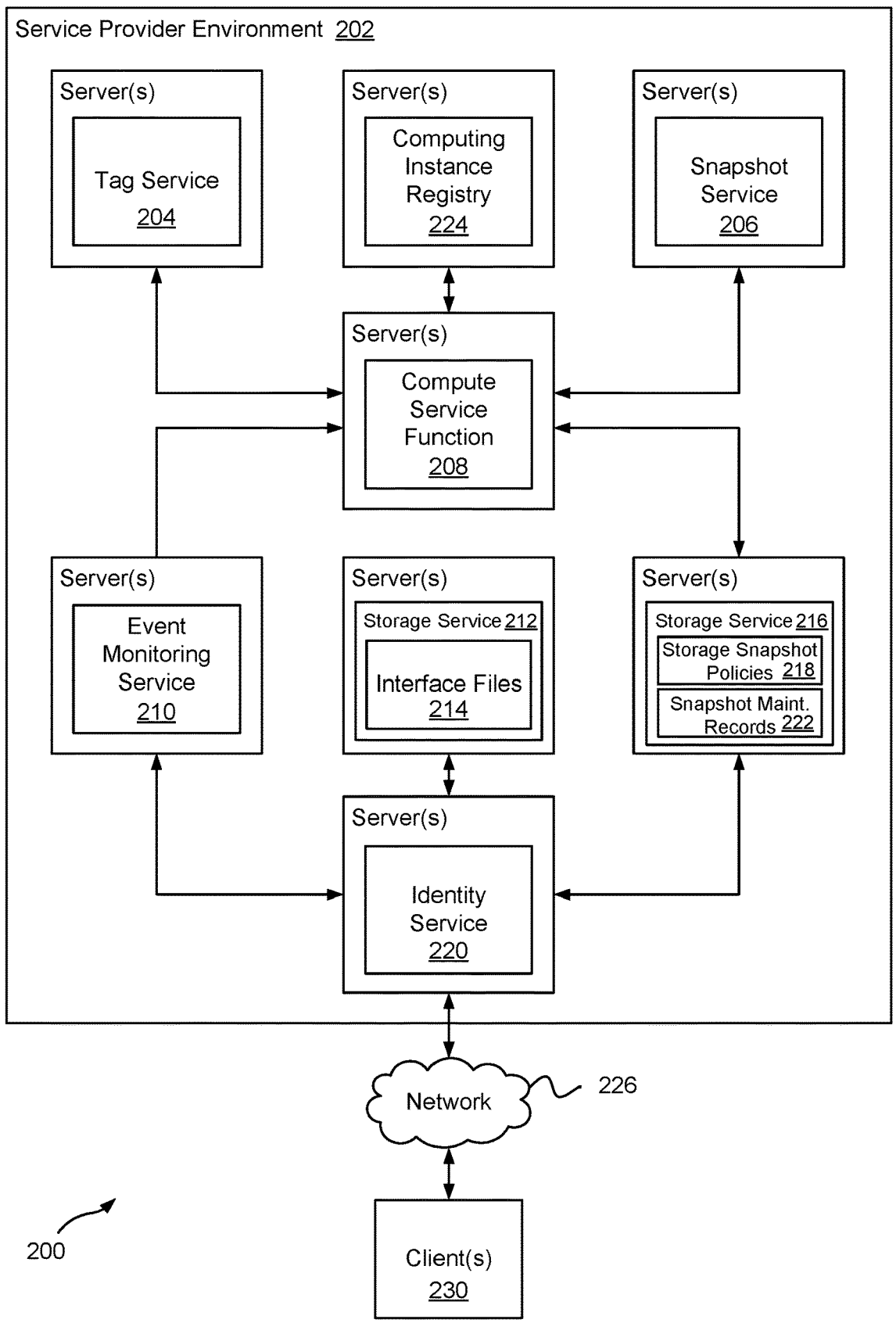
FIG. 2 is a block diagram that illustrates various example components included in a system for creating and managing storage snapshots of storage volumes.

Tags specified in a storage snapshot policy 112 may be used to identify computing instances 130a-n that have been assigned the tags. As one example, computing instances 130a-n assigned a tag specified in a storage snapshot policy 112 may be identified by querying a tag service (as shown in FIG. 2) for computing instance identifiers for computing instances 130a-n assigned the tag. The computing instance identifiers may be used to identify the computing instances 130a-n.

Figure 1C:
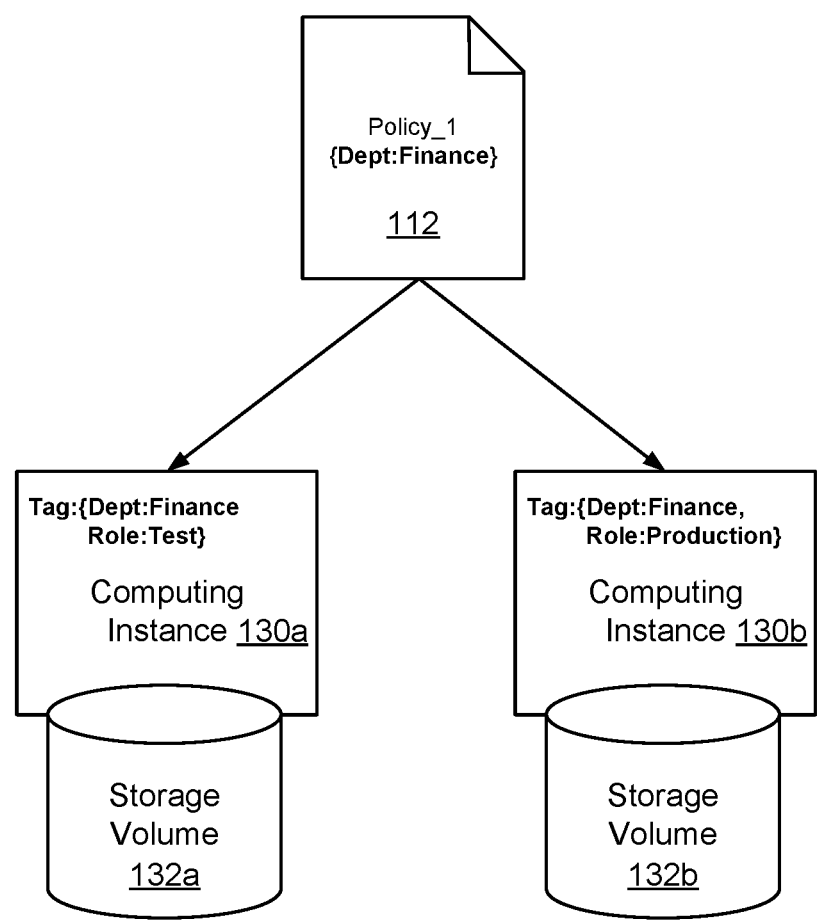

FIG. 1c illustrates an example of using tags to identify computing instances 130a-b that are associated with a storage snapshot policy 112. A tag may be metadata that may be assigned by a customer or application to a computing instance 130a-b. The tag may help customers manage their computing instances 130a-n by allowing the customers to categorize their computing instances 130a-b in different ways, such as by computing instance purpose, owner, or environment. Assigning tags to computing instances 130a-b enables the computing instances 130a-b to be identified using the tags.

In one example, a tag may comprise a key-value pair that identifies and/or describes a computing instance 130a-b (e.g., "Dept:Finance"). A particular tag may be assigned to one or multiple computing instances 132a-b. As an illustration, the tag "Dept:Finance" may be assigned to one computing instance or to multiple computing instances owned by a finance department. A storage snapshot policy 112 may be configured to be applied to storage volumes 132a-b assigned to computing instances 130a-b having a particular tag. As an illustration, a storage snapshot policy 112 configured to specify the tag "Dept:Finance" may be applied to computing instances 130a-b assigned the tag "Dept:Finance". In applying the storage snapshot policy 112, storage volumes 132a-b assigned to the computing instances 130a-b having the "Dept:Finance" tag may be identified and storage snapshots of the storage volumes 132a-b may be created.

In one example, a customer may create storage snapshot policies 112 that specify various tag combinations, such that a storage snapshot policy 112 may apply to a storage volume 132a-b assigned to a computing instance 130a-b having a more narrowly defined tag. For example, computing instances 130a-b may be assigned multiple tags forming various tag combinations. As an illustration, a computing instance 130a may be assigned a Dept:Finance" tag and a "Role:Test" tag, and a computing instance 130b may be assigned a Dept:Finance" tag and a "Role:Production" tag to further categorize the role of the computing instances 130a-b.

Figure 1D:
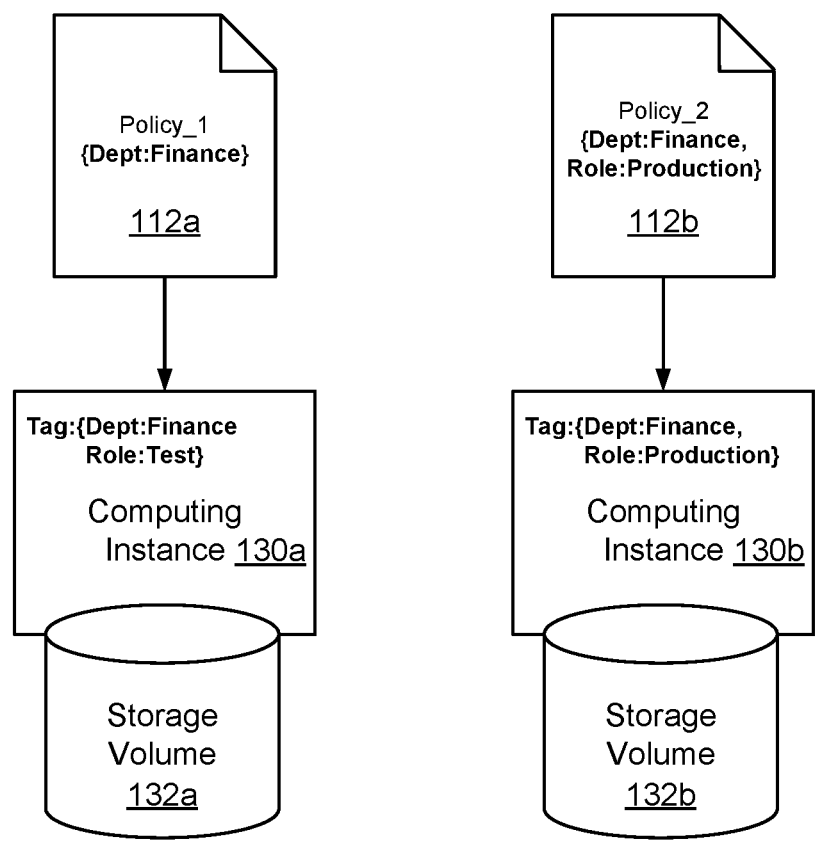

As illustrated in FIG. 1d, a storage snapshot policy 112b may specify a tag combination that more narrowly describes a computing instance 130a-b and associates the storage snapshot policy 112b with storage volumes 132b assigned to the computing instances 130b having the tag combination. The storage snapshot policy 112b may supersede another storage snapshot policy 112a specifying tag(s) that more broadly describe computing instances 130a-b. As an illustration, a customer may create a first storage snapshot policy 112a specifying a "Dept:Finance" tag that is associated with computing instances 130a-b assigned the "Dept:Finance" tag. Sometime thereafter, the customer may create a second storage snapshot policy 112b that specifies the tag combination "Dept:Finance" and "Role:Production". The second storage snapshot policy 112b may be associated with the computing instance 130b assigned the tag combination and because the second storage snapshot policy 112b is more specific to the tags assigned to the computing instance 130b as compared to the tags assigned to the first storage snapshot policy 112a, the second storage snapshot policy 112b may be applied to the storage volume 132b assigned to the computing instance 130b, thereby superseding the first storage snapshot policy 112a.

Figure 1E:
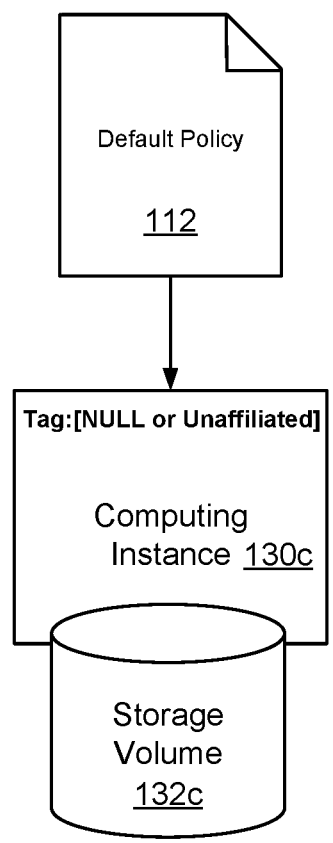

As illustrated in FIG. 1e, a default storage snapshot policy 112 may be applied to storage volumes 132c assigned to computing instances 130c that do not have assigned tags, or have tags that are unaffiliated with any particular storage snapshot policy. For example, a default storage snapshot policy 112 may be defined by a service provider or customer and the default storage snapshot policy 112 may specify a default snapshot lifecycle for storage snapshots created using the default storage snapshot policy 112. Similarly, a default storage snapshot policy 112 may be applied to storage volumes 132c assigned to computing instances 130c having tags that are not associated with any particular storage snapshot policy. That is, existing storage snapshot policies may not specify a tag assigned to a computing instance. In such cases, a default storage snapshot policy 112 may be applied when a storage snapshot policy specifying a particular tag cannot be identified.

Returning to FIG. 1b, in one example, after computing instances 130a-n associated with a storage snapshot policy 112 have been identified, the compute service function 120 may be configured to identify storage volumes 132a-n assigned to the computing instances 130a-n and create storage snapshots 126 of the storage volumes 132a-n, as described in more detail in association with FIG. 2. As will be appreciated, multiple storage volumes 132a-n may be assigned to a single computing instance 130a-b and storage snapshots 126 of the storage volumes 132a-b may be created. A storage service 128 may be configured to maintain the storage snapshots 126. In another example, the compute service function 120 may be configured to send an API (Application Program Interface) request to a snapshot service (as shown in FIG. 2) to create a storage snapshot 126 of a storage volume 132a-n.

As part of creating a storage snapshot 126 of a storage volume 132a-n, a snapshot maintenance record 124 associated with the storage snapshot 126 may be created. The snapshot maintenance record 124 may specify a snapshot lifecycle for the storage snapshot 126, which may determine how long the storage snapshot 126 will be maintained by the storage service 128 before the storage snapshot 126 is deleted. A snapshot lifecycle may be specified in a storage snapshot policy 112. For example, a customer may declare a snapshot lifecycle when creating or editing a storage snapshot policy 112. The snapshot lifecycle may be for an amount of time (e.g., hours, days, or months) to maintain a storage snapshot 126, after which, the storage snapshot 126 may be deleted. Alternatively, a snapshot lifecycle may be based in part on a condition other than an amount of time (e.g., a number of existing storage snapshots that exceeds a threshold), or an event (e.g., termination of a computing instance attached to a storage volume associated with a storage snapshot).

The compute service function 120 may be configured to create a snapshot maintenance record 124 by: obtaining a snapshot lifecycle from a storage snapshot policy 112 associated with a storage volume 132a-n and include the snapshot lifecycle in the snapshot maintenance record 124; link the snapshot maintenance record 124 with a respective storage snapshot 126 using storage snapshot identifier; and store the snapshot maintenance record 124 to the storage service 106. In the case that a storage volume 132a-n may not be associated with a storage snapshot policy 112, a snapshot lifecycle may be obtained from a default storage policy, which may be used to create a snapshot maintenance record 124 for a storage snapshot 126 created for the storage volume 132a-n.

The compute service function 120 may be configured to manage lifecycles of storage snapshots 126 by analyzing snapshot maintenance records 124 linked to the storage snapshots 126 and by deleting a storage snapshot 126 when a snapshot lifecycle specified in a linked snapshot maintenance record 124 has expired. In one example, snapshot lifecycles for existing storage snapshots 126 may be analyzed at the time that a new storage snapshot 126 is created. For example, in addition to creating a new storage snapshot 126 for a storage volume 132a-n, the compute service function 120 may be configured to retrieve snapshot maintenance records 124 for existing storage snapshots 126 of the storage volume 132a-n and analyze snapshot lifecycles for the existing storage snapshots 126. In the case that any of the snapshot lifecycles have expired, the compute service function 120 may be configured to send a request to the storage service 128 to delete the expired storage snapshots 126. In addition, a request may be made to the storage service 106 to delete the snapshot maintenance records 124 associated with the expired storage snapshots 126.

In another example, a second compute service function may be configured to manage lifecycles of storage snapshots 126 for storage volumes 132a-n included in a private virtual network 122. The second compute service function may be launched in response to a scheduled event 114 and may analyze snapshot maintenance records 124 linked to the storage snapshots 126 and delete storage snapshots 126 and linked snapshot maintenance records 124 when snapshot lifecycles specified in the linked snapshot maintenance records 124 have expired.

FIG. 2 illustrates components of an example system 200 on which the present technology may be executed. The system 200 may include a service provider environment 202 accessible to one or more clients 230 via a network 226. The service provider environment 202 may include a number of servers configured to host managed service components used to provide customers with a snapshot management interface that allows the customers to create a storage snapshot policy used to schedule and manage storage snapshots associated with storage volumes assigned to the customers' computing instances. The managed service components may be configured to create and maintain storage snapshots according to the storage snapshot policy.

The service provider environment 202 may include computing resources for executing computing instances (e.g., virtual machines), which may be an instance of a software implementation of a machine that executes applications like a physical machine, as described in relation to FIG. 3. In one example, the computing instances may be used to host one or more of the managed service components.

As illustrated, the managed service components may include an event monitoring service 210, storage services 212/216, compute service function 208, a tag service 204, a snapshot service 206, an identity service 220, as well as other services and modules. The storage service 212 may be configured to manage interface files 214 that may be executable by a browser application on a client 230. In one example, the storage service 212 may provide object-based storage. Interface files 214 may be stored in a storage container referenced by a URL, making the interface files 214 accessible to a client 230 via the URL. In another example, the storage service 212 may provide relational storage or NoSQL storage that may be used to maintain the interface files 214.

A client 230 may be configured to request the interface files 214 (e.g., using a URL) from the storage service 212. The request may be received at the identity service 220, which may be configured to authenticate a customer using a username/password or federated identity provided by the customer. In response to the request, the interface files 214 may be retrieved from the storage service 212 and returned to the client 230 and the interface files 214 may be executed on the client 230 using a browser application configured to display a snapshot management interface within a browser window.

A customer may create, edit, and delete storage snapshot policies 218 using the snapshot management interface provided via the interface files 214. Storage snapshot policies 218 created using the snapshot management interface may be stored to the storage service 216. For example, a customer, using a client 230, may enter snapshot policy information into fields provided by the snapshot management interface and the information may be obtained from the interface fields and sent to the storage service 216 using a data exchange format, such as XML (Extensible Markup Language) or JSON (JavaScript Object Notation). The storage snapshot policy 218 may be stored as a data record that may be retrieved by the various managed service components.

As part of creating a storage snapshot policy 218, a customer defined event may be registered with the event monitoring service 210, which may be configured to detect an occurrence of the event and launch a compute service function 208. For example, in association with creating a storage snapshot policy 218, the snapshot management interface may be configured to send a request to the event monitoring service 210 to create an event record that defines an event (e.g., a schedule or condition). The request may include event information (e.g., frequency, time, and/or event information) specified in the storage snapshot policy 218. In response, the event monitoring service 210 may create the event record according to the request and register the event record with the event monitoring service 210.

In detecting a customer defined event, the event monitoring service 210 may be configured to launch a compute service function 208. The compute service function 208 may be configured to create and manage storage snapshots for storage volumes as described earlier. The compute function 208 may be launched on a server included in the service provider environment 202. More specifically, a compute service function 208 may be launched on a computing instance executing on a server, wherein the computing instance may host a software container that executes the compute service function 208. A software container may provide an isolated environment for a processing the compute service function 208 on a computing instance by creating a virtual container in which the compute service function dependencies are contained. A computing instance used to execute a compute service function 208 may be selected at launch time.

In launching an compute service function 208, the event monitoring service 210 may be configured to provide the compute service function 208 with an identifier that may be used by the compute service function 208 to retrieve a storage snapshot policy 218 associated with the identifier. The compute service function 208 may retrieve the storage snapshot policy 218 from the storage service 216, and information included in the storage snapshot policy 218 may be used by the compute service function 208 to identify storage volumes, for which storage snapshots may be created and managed (e.g., automatically deleted according to a snapshot lifecycle).

In one example, the compute service function 208 may be configured to obtain computing instance identifiers for computing instances assigned one or more tags specified in a storage snapshot policy 218. The tag service 204 may be configured to identify a computing instance(s) assigned a tag and provide a computing instance identifier(s) in response to a request. Thereafter, a computing instance identifier obtained from the tag service 204 may be used to identify a computing instance in a computing instance registry 224, which may provide information about a computing instance associated with the computing instance identifier. In particular, information for a storage volume(s) assigned to a computing instance may be obtained from the computing instance registry 224.

The compute service function 208 may be configured to provide a storage volume identifier obtained from the computing instance registry 224 to the snapshot service 206 in an API request to create a storage snapshot of a storage volume associated with the storage volume identifier. In response to the request, the snapshot service 206 may cause a storage snapshot of the storage volume associated with the storage volume identifier to be created and return a storage snapshot identifier for the storage snapshot. In some examples, the snapshot service 206 may be configured to suspend or disable write access to a storage volume in order to create a storage snapshot.

The compute service function 208 may be configured to create a snapshot maintenance record 222 for a storage snapshot created by the snapshot service 206. In creating the snapshot maintenance record 222, snapshot lifecycle information may be obtained from a storage snapshot policy 218 and the snapshot lifecycle information may be included in the snapshot maintenance record 222, along with a storage snapshot identifier provided by the storage snapshot service 206. Snapshot maintenance records 222 created by a compute service function 208 may be provided to the storage service 216.

As described earlier, a snapshot maintenance record 222 may be evaluated to determine whether a storage snapshot has expired. Storage snapshots that have expired may be automatically deleted along with snapshot maintenance records 222 associated with the storage snapshots. In one example, the compute service function 208 may be configured to evaluate snapshot maintenance records 222 and send requests to the snapshot service 206 to delete storage snapshots that have expired. The requests may include storage snapshot identifiers obtained from the snapshot maintenance records 222 that may be used by the snapshot service 206 to identify the expired storage snapshots and delete the storage snapshots. In addition, the compute service function 208 may be configured to delete snapshot maintenance records 222 associated with the expired storage snapshots.

A customer may utilize a client 230 to execute the snapshot management interface described earlier. A client 230 may include any device capable of sending and receiving data over a network 226. A client 230 may comprise, for example a processor-based system such as a computing device. The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software.

The storage services 212/216 may manage data stores used to store the interface files 214, storage snapshot policies 218, snapshot maintenance records 222, and other data. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the services and modules included in the service provider environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 226 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain services may be discussed in connection with this technology. In one example configuration, a service may include one or more processes executing on a server or other computer hardware. Such services may be centrally hosted functionality or a service application that may receive requests and provide output to other services or consumer devices. For example, services may be considered on-demand computing that are hosted in a server, virtualized service environment, grid, or cluster computing system. An API may be provided for each service to enable a second service to send requests to and receive output from the first service. Such APIs may also allow third parties to interface with the service and make requests and receive output from the services. While FIG. 2 illustrates an example of a system that may implement the techniques above, many other similar or different environments are possible. The example environments discussed and illustrated above are merely representative and not limiting.

FIG. 3 is a block diagram illustrating an example service provider environment 300 that may be used to execute and manage a number of computing instances 304a-e. In particular, the service provider environment 300 depicted illustrates one environment in which the technology described herein may be used. The service provider environment 300 may be one type of environment that includes various virtualized service resources that may be used, for instance, to host computing instances 304a-e.

The service provider environment 300 may be capable of delivery of computing, storage and networking capacity as a software service to a community of end recipients. In one example, the service provider environment 300 may be established for an organization by or on behalf of the organization. That is, the service provider environment 300 may offer a "private cloud environment." In another example, the service provider environment 300 may support a multi-tenant environment, wherein a plurality of customers may operate independently (i.e., a public cloud environment). Generally speaking, the service provider environment 300 may provide the following models: Infrastructure as a Service ("IaaS"), Platform as a Service ("PaaS"), and/or Software as a Service ("SaaS"). Other models may be provided. For the IaaS model, the service provider environment 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the service provider environment 300. End customers may access the service provider environment 300 using networked client devices, such as desktop computers, laptops, tablets, smartphones, etc. running web browsers or other lightweight client applications, for example. Those familiar with the art will recognize that the service provider environment 300 may be described as a "cloud" environment.

The particularly illustrated service provider environment 300 may include a plurality of physical hosts 302a-e. While four physical hosts 302a-e are shown, any number may be used, and large data centers may include thousands of physical hosts. The service provider environment 300 may provide computing resources for executing computing instances 304a-e. Computing instances 304a-e may, for example, be virtual machines. A virtual machine may be an instance of a software implementation of a machine (i.e. a computer) that executes applications like a physical machine. In the example of a virtual machine, each of the physical hosts 302a-e may be configured to execute an instance manager 308a-e capable of executing the instances. The instance manager 308a-e may be a hypervisor, virtual machine monitor (VMM), or another type of program configured to enable the execution of multiple computing instances 304a-e on a single server. Additionally, each of the computing instances 304a-e may be configured to execute one or more applications.

One or more physical hosts 316 may be reserved to execute software components for managing the operation of the service provider environment 300 and the computing instances 304a-e. For example, a physical host 316 may execute a management component 318. A customer may access the management component 318 to configure various aspects of the operation of the computing instances 304a-e purchased by a customer. For example, the customer may setup computing instances 304a-e and make changes to the configuration of the computing instances 304a-e.

A deployment component 322 may be used to assist customers in the deployment of computing instances 304a-e. The deployment component 322 may have access to account information associated with the computing instances 304a-e, such as the name of an owner of the account, credit card information, country of the owner, etc. The deployment component 322 may receive a configuration from a customer that includes data describing how computing instances 304a-e may be configured. For example, the configuration may include an operating system, provide one or more applications to be installed in computing instances 304a-e, provide scripts and/or other types of code to be executed for configuring computing instances 304a-e, provide cache logic specifying how an application cache should be prepared, and other types of information. The deployment component 322 may utilize the customer-provided configuration and cache logic to configure, prime, and launch computing instances 304a-e. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching computing instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the service provider environment 300 and the physical hosts 302a-e, 316. The network 310 may be a local area network (LAN) and may be connected to a Wide Area Network (WAN) 312 or the Internet, so that end customers may access the service provider environment 300. The network topology illustrated in FIG. 3 has been simplified, many more networks and networking devices may be utilized to interconnect the various computing systems disclosed herein.

Figure 4:
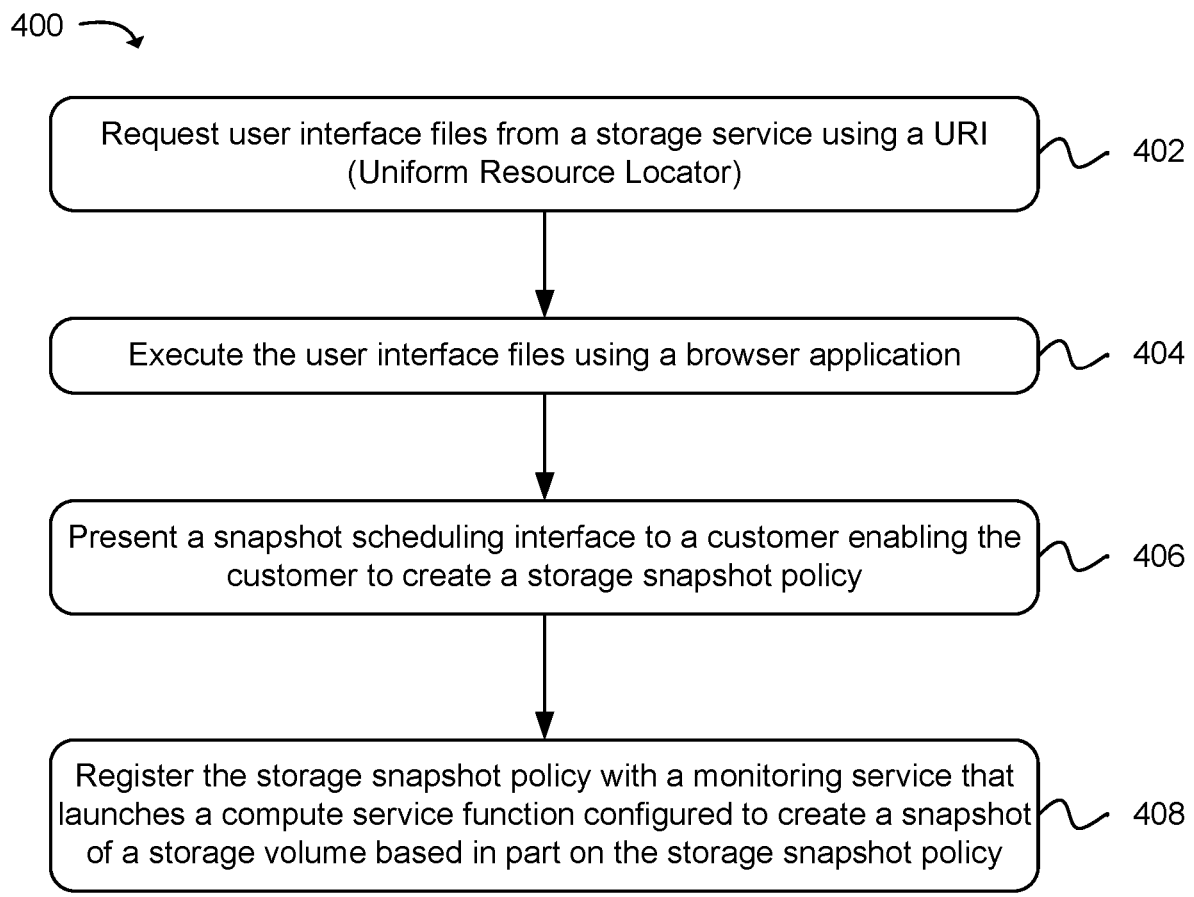
FIG. 4 is a flow diagram illustrating an example method for creating a storage snapshot policy using a snapshot management interface.

Moving now to FIG. 4, a flow diagram illustrates an example method 400 for creating a storage snapshot policy using a snapshot management interface. As in block 402, a client may be configured to request user interface files from a storage service using a URL that references the user interface files. For example, a customer using a client (e.g. client device, such as a computer or mobile device) may enter a URL into a browser application that references an HTML file that includes client-side scripting. The browser application may be configured to retrieve the HTML file from the storage service using the URL.

After retrieving the user interface files from the storage service, as in block 404, the user interface files may be executed using a browser application on the client. For example, an HTML file may be loaded into a browser window and the browser application may execute any client-side scripts included with the HTML file. In doing so, as in block 406, a snapshot management interface may be presented to the customer via the client, thereby enabling the customer to create a storage snapshot policy. The customer may enter storage snapshot policy information into data fields included in the snapshot management interface and the information entered by the customer may be captured and placed in a data exchange format and sent to a storage service. Illustratively, the information in the storage snapshot policy may include: a schedule for creating storage snapshots or a defined event that triggers the creation of a storage snapshot; computing instance tags used to identify storage volumes assigned to computing instances associated with the computing instance tags; snapshot lifecycle information, such as a retention period; and other information that may be associated with creating and managing storage snapshots.

As in block 408, the storage snapshot policy created by the customer may be registered with a monitoring service that launches a compute service function configured to create a snapshot of a storage volume based in part on the storage snapshot policy. For example, the snapshot management interface may be in network communication with the monitoring service and as part of creating the storage snapshot policy, instructions may be sent to the monitoring service to detect a scheduled event or a defined event and launch a compute service function. The storage snapshot policy may be registered with the monitoring service so that an identifier or reference for the storage snapshot policy may be provided to a compute service function when launched.

Figure 5:
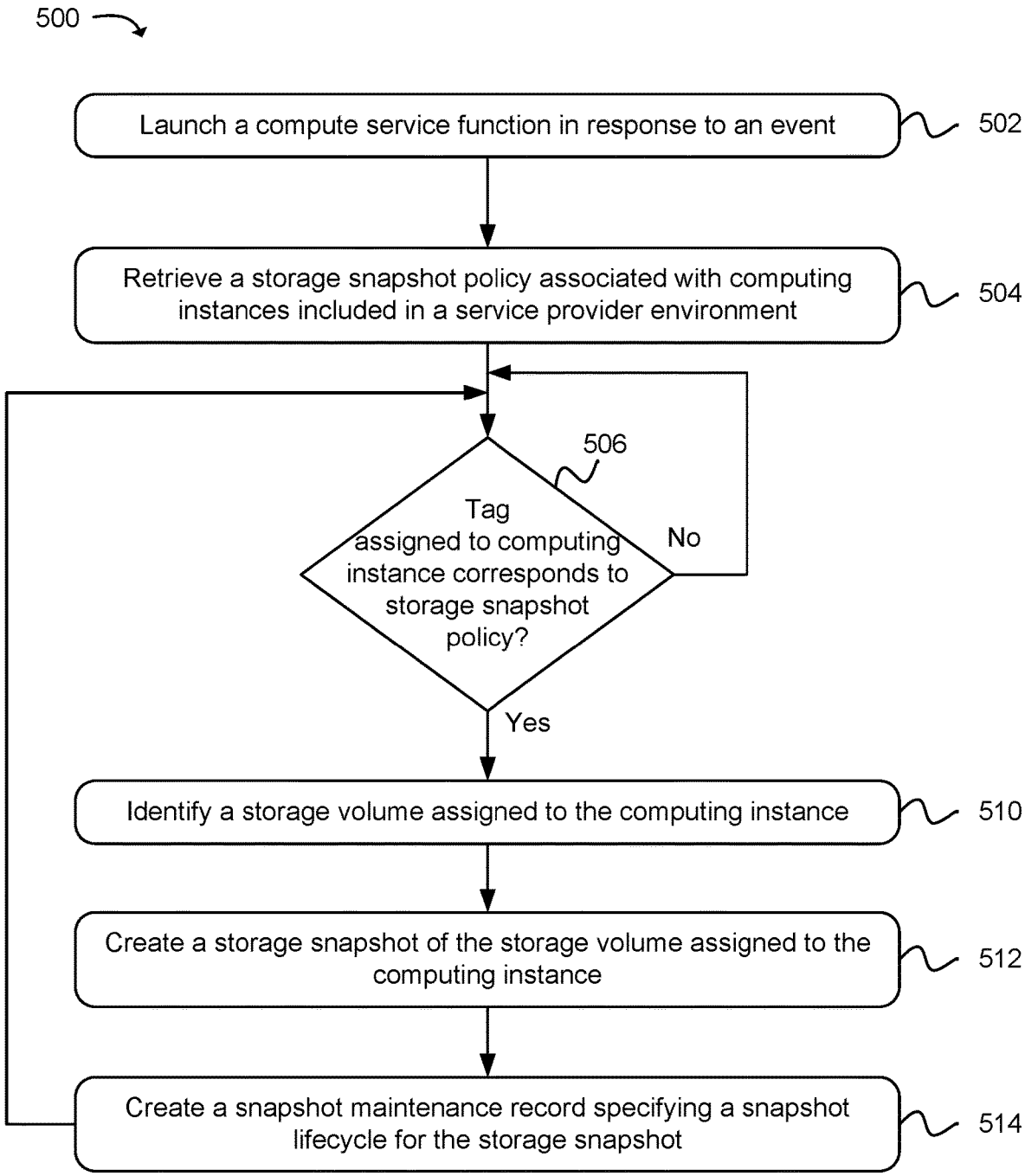
FIG. 5 is a flow diagram that illustrates an example method for implementing a storage snapshot policy.

FIG. 5 is a flow diagram illustrating an example method 500 for implementing a storage snapshot policy. As in block 502, a compute service function may be launched in response to an event. For example, a monitoring service may be configured to detect a scheduled event (e.g., a reoccurring day and time) and/or a defined event (e.g., a specified utilization percentage of a storage volume) and launch a compute service function.

As in block 504, the compute service function may be configured to retrieve a storage snapshot policy associated with computing instances included in a service provider environment from a storage service using an identifier or reference for the storage snapshot policy. The storage snapshot policy may specify one or more tags that may be assigned to computing instances included in the customer's private virtual network. Computing instances assigned a tag(s) may be identified. As in block 506, in the case that a computing instance is identified as being assigned the tag(s), then as in block 510, a storage volume assigned to the computing instance may be identified.

Having identified a storage volume assigned to the computing instance, as in block 512, a storage snapshot of the storage volume assigned to the computing instance may be created. In one example, the compute service function may be configured to call a snapshot service configured to create a storage snapshot of the storage volume. In another example, the compute service function may be configured to create the storage snapshot. The storage snapshot may be maintained using a storage service.

In addition to creating the storage snapshot of the storage volume, as in block 514, a snapshot maintenance record specifying a snapshot lifecycle for the storage snapshot may be created. The snapshot lifecycle may be specified by the storage snapshot policy. As such, snapshot lifecycle information may be obtained from the storage snapshot policy and included in the snapshot maintenance record. A storage snapshot identifier may link the snapshot maintenance record to the storage snapshot. The snapshot maintenance record may be used to manage the lifecycle of the storage snapshot as described below.

Figure 6:
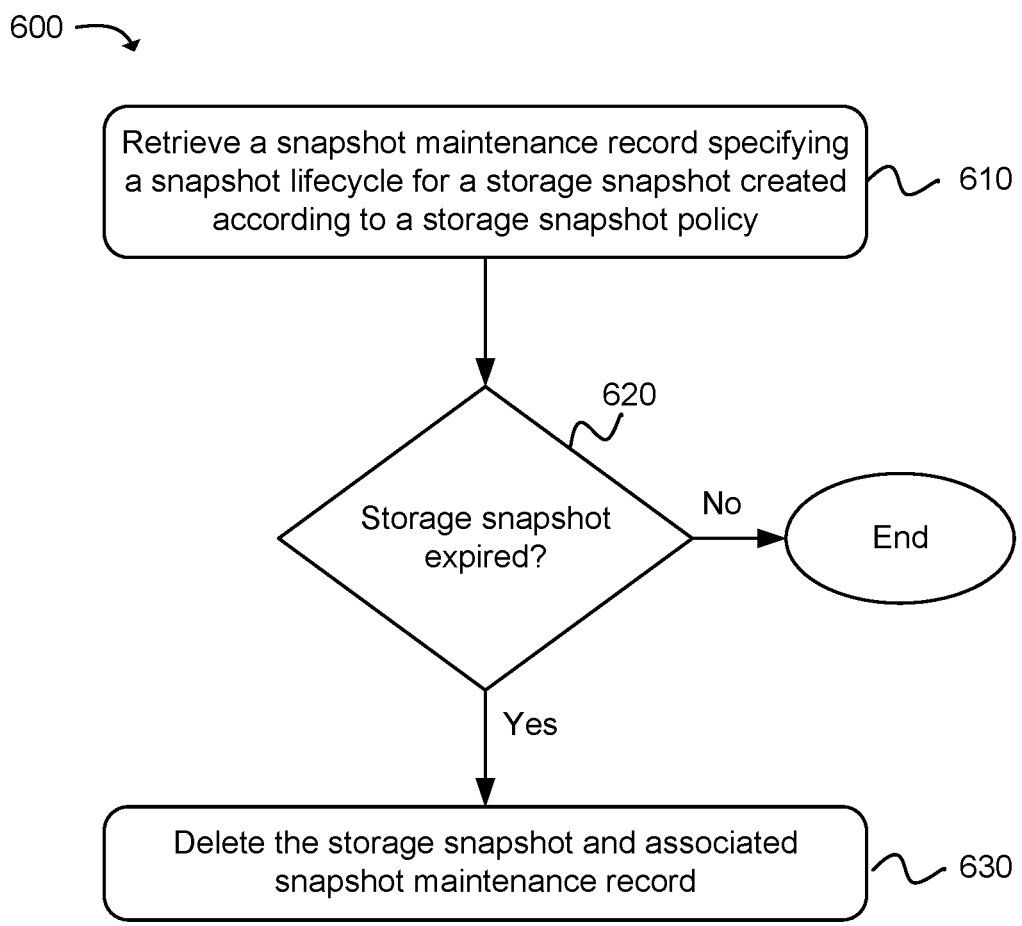
FIG. 6 is a block diagram illustrating an example system for managing storage snapshots using snapshot maintenance records.

FIG. 6 is a flow diagram that illustrates and example method 600 for managing storage snapshots using snapshot maintenance records. As in block 610, a snapshot maintenance record specifying a snapshot lifecycle for a storage snapshot created according to a storage snapshot policy may be retrieved. In one example, lifecycles of existing storage snapshots may be evaluated at the time that a new storage snapshot is created. For example, in addition to creating a storage snapshot of a storage volume, a compute service function may be configured to retrieve snapshot maintenance records for storage snapshots associated with the storage volume and evaluate the snapshot maintenance records to determine whether associated storage snapshots have expired. In another example, a separate compute service function configured to evaluate snapshot maintenance records for existing storage snapshots associated with a storage volume may be launched periodically, or in tandem with a compute service function used to create a new storage snapshot of the storage volume.

As in block 620, a determination may be made whether the storage snapshot has expired. For example, a snapshot lifecycle (e.g., a retention period, condition, event, etc.) specified in the snapshot maintenance record may be evaluated to determine whether the storage snapshot has expired. In the case that a determination is made that a storage snapshot associated with the snapshot maintenance record is expired, then as in block 630, the storage snapshot and the associated snapshot maintenance record may be deleted. In the case that the storage snapshot has not expired, not action may be taken.

Figure 7:
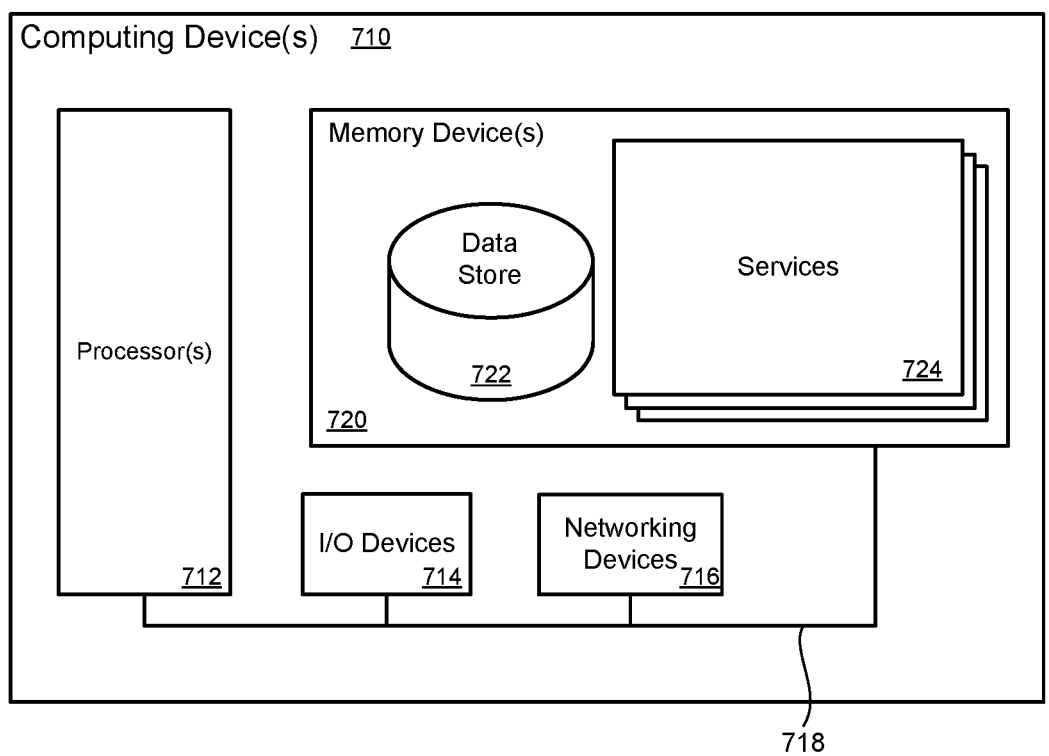
FIG. 7 is block diagram illustrating an example of a computing device that may be used to execute a method for implementing a storage snapshot policy.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain services 724 and a compute service function that are executable by the processor(s) 712 and data for the services 724. For example, the memory device 720 may contain an event monitoring service configured to launch a compute service function on the memory device 720. The services 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory device 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system, comprising:
   at least one processor;
   a memory device including instructions that, when executed by the at least one processor, cause the system to:
   receive a request to create a storage snapshot of a storage volume associated with a tag assigned to a computing instance,
   wherein the storage volume is assigned for use by the computing instance, which is hosted in a service provider environment;
   identify the storage volume associated with the tag; and
   initiate creation of the storage snapshot of the storage volume associated with the tag.

2. The system in claim 1, wherein the memory device further includes instructions that, when executed by the at least one processor, cause the system to:
   identify multiple storage volumes associated with the tag; and
   initiate creation of same point-in-time storage snapshots for the multiple storage volumes.

3. The system in claim 1, wherein the tag comprises metadata used to categorize the computing instances associated with the tag.

4. The system in claim 1, wherein the tag comprises a key-value pair that describes the computing instances associated with the tag.

5. The system in claim 1, wherein the storage volume for use by the computing instance is virtualized block storage hosted in the service provider environment, and the storage snapshot is an incremental backup of the virtualized block storage.

6. The system in claim 1, wherein the memory device further includes instructions that, when executed by the at least one processor, cause the system to retrieve a storage snapshot policy that specifies the tag associated with the computing instance and an event that initiates the creation of the storage snapshot.

7. The system in claim 6, wherein the storage snapshot policy includes a customer specified frequency, time, or condition that initiates the creation of the storage snapshot.

8. The system in claim 1, wherein the memory device further includes instructions that, when executed by the at least one processor, cause the system to create a snapshot maintenance record specifying a snapshot lifecycle for the storage snapshot.

9. A computer implemented method, comprising:
   retrieving a storage snapshot policy for managing creation of storage snapshots of a storage volume associated with a tag assigned to a computing instance,
   wherein the computing instance is hosted in a service provider environment, and the storage volume is assigned to the computing instance for use by the computing instance;
   identifying the storage volume using the tag specified in the storage snapshot policy; and
   initiating creation of a storage snapshot of the storage volume associated with the tag.

10. The method in claim 9, further comprising:
    identifying multiple storage volumes assigned to the computing instance; and
    initiating creation of same point-in-time storage snapshots for the multiple storage volumes.

11. The method in claim 9, wherein the storage snapshot policy defines a scheduled event that triggers the creation of the storage snapshot of the storage volume assigned to the computing instance associated with the tag.

12. The method in claim 9, wherein the storage snapshot policy specifies a defined event that triggers the creation of the storage snapshot of the storage volume assigned to the computing instance associated with the tag.

13. The method in claim 9, wherein the storage volume assigned to the computing instance is included in a private virtual network associated with a customer account, and the private virtual network is provided by a service provider.

14. The method in claim 9, wherein initiating creation of the storage snapshot further comprises:
creating a snapshot of at least one file stored on the storage volume; and
creating a file snapshot maintenance record specifying a snapshot lifecycle for the file specified by the storage snapshot policy.

15. The method as in claim 9, further comprising:
identifying an untagged computing instance included in a customer account in the service provider environment; and
creating a default storage snapshot for a storage volume assigned to the untagged computing instance based in part on a default storage snapshot policy.

16. A non-transitory machine readable storage medium having instructions embodied thereon, wherein the instructions when executed by at least one processor:
receive a request to create storage snapshots of storage volumes assigned to computing instances associated with a tag, wherein the computing instances are hosted in a service provider environment;
identify a computing instance that is associated with the tag;
determine that multiple storage volumes are assigned to the computing instance; and
initiate creation of the storage snapshots of the multiple storage volumes assigned to the computing instance.

17. The non-transitory machine readable storage medium as in claim 16, further comprising instructions, that when executed by the at least one processor:
obtain an identifier for the computing instance associated with the tag; and
identify the multiple storage volumes that are associated with the identifier for the computing instance.

18. The non-transitory machine readable storage medium as in claim 16, wherein the request to create the storage snapshots further comprises sending an API (Application Program Interface) request to a snapshot service hosted in the service provider environment used to initiate creation of the storage snapshots.

19. The non-transitory machine readable storage medium as in claim 16, further comprising instructions, that when executed by the at least one processor retrieve a storage snapshot policy for managing the creation of the storage snapshots, wherein the storage snapshot policy specifies the tag associated with the computing instances and defines an event that causes creation of the storage snapshots of the multiple storage volumes assigned to the computing instances associated with the tag.

20. The non-transitory machine readable storage medium as in claim 16, further comprising instructions, that when executed by the at least one processor create a snapshot maintenance record specifying a snapshot lifecycle for the storage snapshots of the multiple storage volumes assigned to the computing instances associated with the tag.

\* \* \* \* \*